United States Patent [19]

Hansen et al.

[11] Patent Number: 5,141,763
[45] Date of Patent: Aug. 25, 1992

[54] PROCESS FOR PRODUCING PROTEIN PRODUCT FROM BONE-CONTAINING ANIMAL MATERIAL

[75] Inventors: Poul-Ivar Hansen, Søborg; Finn S. Bodker, Hedensted, both of Denmark

[73] Assignee: Slagteriernes Forskningsinstitut, Roskilde, Denmark

[21] Appl. No.: 653,755

[22] Filed: Feb. 11, 1991

Related U.S. Application Data

[63] Continuation of Ser. No. 433,437, Nov. 8, 1989, abandoned, which is a continuation of Ser. No. 119,111, Nov. 10, 1987, abandoned.

[30] Foreign Application Priority Data

Nov. 11, 1986 [DK] Denmark .............................. 5373/86

[51] Int. Cl.⁵ ........................... A23J 3/04; A23L 1/31
[52] U.S. Cl. ..................................... 426/464; 426/480
[58] Field of Search ............... 426/641, 646, 651, 456, 426/464, 478, 479, 480; 209/211

[56] References Cited

U.S. PATENT DOCUMENTS 4,389,423 6/1983 Madsen ........................... 426/480 X
4,565,709 1/1986 Berge ............................... 426/480 X

FOREIGN PATENT DOCUMENTS 951563 7/1974 Canada ................................. 426/480
2802271 8/1978 Fed. Rep. of Germany ...... 426/480
906946 1/1982 U.S.S.R. .
901845 7/1962 United Kingdom ................ 426/480

Primary Examiner—Arthur L. Corbin
Attorney, Agent, or Firm—Fleit, Jacobson, Cohn, Price, Holman & Stern

[57] ABSTRACT

Bone-containing animal material, such as slaughterhouse waste which has been scoured and dewatered by pressing, is separated into a bone-containing phase and a meat protein-containing phase by stirring the material with water after comminution to form a suspension (2) which is subjected to a separation in a hydrocyclone (8). The suspension is hereby separated into a bone-containing phase leaving the cyclone through its bottom nozzle, and into a meat protein-containing phase leaving the cyclone through its vortex detector and being processed into a protein product in a manner known per se.

In the phase rich in meat protein at least about 70 weight-% of the dry matter is protein, whereas the bone-containing phase has a protein-content in the dry matter of less than 40 weight-%, including the ossein contained in the bones.

12 Claims, 2 Drawing Sheets

PROCESS FOR PRODUCING PROTEIN PRODUCT FROM BONE-CONTAINING ANIMAL MATERIAL

This application is a continuation of application Ser. No. 07/433,437, filed Nov. 8, 1989, now abandoned, which is a continuation of application Ser. No. 07/119,111, filed Nov. 10, 1987, now abandoned.

BACKGROUND OF THE INVENTION

1. Field of the Invention

The present invention relates to a process for producing protein products on the basis of bone-containing animal material, characterized in what is stated in the characterizing part of claim 1.

2. Description of the Related Art

Hog and cattle slaughterhouse waste is usually processed in meat processing plants to industrial lard and meat-and-bone meal used for protein supplement for animal fodder.

Danish patent specification No. 147 568 thus describes a process for scouring and dewatering animal waste essentially comprising slaughterhouse waste, confiscates and dead beasts. According to this process the waste is comminuted into pieces, the diameters of which essentially do not exceed 20 mm, and the comminuted material is heated to a temperature within the range 40°–60° C. Considerable amounts of glue-water and liquid fat are removed from the said material in a screw press. The resulting press cake containing bone and meat protein may subsequently be dried, sterilized and ground to a fine powder suited for fodder supplement. It contains about 45% protein, which corresponds to the protein-content of ordinary meat-and-bone meal.

For many uses the bone material in the product is only an useless filler, as the meat-and-bone meal is primarily dosed according to its meat protein content. However, the bone material has a high content of calcium phosphate, and as it is also desirable to obtain a protein product having the highest possible protein content, the press cake may advantageously be separated into a protein-containing meat fraction and a mineral-containing bone fraction.

Thus, it is the object of the present invention to devise a process for producing protein products from bone-containing animal material, by which process the bone material can be separated from the meat protein material in a commerically useful way. According to the present invention it has surprisingly been found that it is possible in an efficient way to separate a bone-containing animal material into two fractions, viz. a meat fraction rich in protein and a mineral-containing bone fraction, each separately being commercially interesting.

It is known to separate a bone-containing material into several commercially interesting fractions. EP patent specification No. 0 020 722 thus describes a process for continuously producing gelatine from a meat and fat-containing bone material which is chopped and separated into a meat/fat fraction and a bone fraction. The bone fraction is ground and heated to maximally 121° C., and after air classification a material is obtained which is usable for producing gelatine.

U.S. Pat. No. 3,594,190 describes a process for recovering adhering meat from bone waste. The waste is tumbled in a rotating drum in the presence of water or salt brine, whereby a meat slurry is formed which due to its binding power and food value can be used in sausage manufacture.

DK public disclosure No. 146 872 describes a process for producing fat and meat-and-bone meal from animal raw materials, by which slaughterhouse waste is boiled and centrifuged, the solid components subsequently being dried to a meat-and-bone meal having a protein content of about 40%. The liquid phase is separated into fat, glue-water and slurry in a centrifuge. The glue-water is concentrated and dried together with the slurry to form a second meat-and-bone meal fraction having a protein content amounting to 66%.

DK public disclosures No. 150 005 and 150 006 describe production of protein products from animal raw materials. According to the former disclosure slaughterhouse waste is pressure boiled and subsequently separated into solid matter and liquid. The solid matter is dried and separated by means of a sieve into meat-and-bone meal containing about 46% protein and a bone product which is ground to a mineral powder containing about 30% protein, while the liquid is separated into fat and glue-water which is spray-dried to form a glue powder containing about 79% protein. The latter disclosure describes a heat treatment at 80°–100° C. in water of slaughterhouse waste containing entire bones and/or large bone pieces. When meat tissue and fat tissue by the treatment have been loosened from the bone material it is removed from the slurry by means of a sieve and processed into a glue powder rich in protein, while the slurry after separation from fat and glue-water can be dried to a meat protein powder having a protein content above 70%.

SUMMARY OF THE INVENTION

It has turned out that in a surprisingly simple and economically attractive way it is possible to separate bone-containing animal material into a protein and a bone fraction by stirring comminuted material with water to form a suspension which is subsequently separated in a hydrocyclone. By this are obtained a bone-containing phase leaving the hydrocyclone through its bottom nozzle, and a meat-containing phase leaving the hydrocyclone through its vortex detector.

After separation of glue-water it is thus possible to achieve a fraction rich in meat protein, in which at least about 70 weight-% of the dry material is protein, and a fraction rich in bone, in which less than 40 weight-% of the dry material is protein, including the ossein contained in the bones.

The apparatus necessary for carrying out the process is small and cheap to install. In view of this the process according to the present invention provides a considerably more effective separation than any of the previously known processes.

Hydrocyclones have not until now been used in solid material separation processes within the meat fodder industry. SU patent specification No. 906 946 describes separation of fat and protein-containing waste by means of a hydrocyclone, however, for sewage purification in accordance with the traditional hydrocyclone usage, viz. removal of particles from liquids.

It has now surprisingly been found that it is possible by means of a hydrocyclone to separate slaughterhouse waste into two essentially different solid material fractions. It has turned out that by restricted comminution of the material and tumbling relatively large amounts of the material in water, succeeded by a hydrocyclone treatment, it is possible to obtain not only particularly satisfactory separation but also to avoid considerable clogging problems which could otherwise be expected in slurries having a high content of coarse solid materials. More specifically, what is obtained is a separation approaching the maximum separation mechanically possible. Consequently, a meat protein phase is achieved which is usable directly after removal of water, and at the same time the bone phase contains only little meat and is usable for various purposes. In known separating methods, such as flotation in water or 25% (w/v) NaCl, fractions are not obtained having a protein content above 50-60 weight-%, cf. report No. 849 from Meat Industry Research Institute of New Zealand, Inc. (MIRINZ).

The meat-containing animal material is preferably a feedstock material comminuted into pieces which essentially are not longer than 20 mm. This significantly reduces the risk of the bottom nozzle of the hydrocyclone being clogged by bone pieces.

Advantageously, a feedstock material can be used which consists of comminuted slaughterhouse waste heated to a temperature within the range 50°-100° C. and pressed in a screw press to remove fat and glue-water. This feedstock material appears to be less inclined to form lumps than are non-scoured animal materials. Furthermore, it is possible to control the solid matter content in the suspension fed to the cyclone, as pressed out, scoured glue-water can be dosed according to need when preparing this suspension.

To avoid excess amounts of liquid in the process a suspension is preferably prepared having a high content of solid materials. According to the invention a suspension is advantageously prepared which contains at least 5 and at the most 25% dry matter.

The feedstock material is preferably stirred with water in a mixing bin by means of a circulating pump. This results in a comparatively uniform slurry of the feedstock components, which are dissimilar as regards size and density.

The most homogenous suspension is found at the outlet of the circulating pump. The suspension is passed to the hydrocyclone by means of a revolution-adjustable pump to allow the hydrocyclone to be set for the best possible working conditions. Accordingly, a special embodiment of the process according to the invention is characterized in that the suspension is passed to the inlet of the hydrocyclone by means of a revolution-adjustable pump which receives the suspension from the circulating pump outlet.

The circulating pump supplying the suspension to the hydrocyclone, or any kind of pump, which is located before the cyclone, may be so adapted as to further comminute the feedstock material, or other cutting means, such as mills, may be provided for further cutting down of the material prior to its separation in the cyclone. This reduces the risk of the bottom nozzle of the cyclone being clogged. Accordingly, an embodiment of the process according to the invention is characterized in that the material is further comminuted prior to its introduction into the hydrocyclone inlet.

The hydrocyclone is preferably a cyclone having a cone angle exceeding 25°. These are the so-called wide-angle hydrocyclones. A preferred cyclone has a cone angle within the range 60°-120°.

The meat-containing phase leaving the cyclone through its vortex detector always contains some bone pieces, dependent upon the working conditions of the cyclone. Similarly, the bone phase leaving the cyclone through its bottom nozzle always contains some meat lumps. Only rarely can the hydrocyclone be adjusted to operate optimally both as regards the meat phase and the bone phase, although it is capable of providing satisfactory separation between the phases. In order to improve on this there may according to the present invention be used an additional hydrocyclone in series with the bottom nozzle or vortex detector outlet of the first hydrocyclone.

In this embodiment the main cyclone can be so set that one of its outlet products is optimal as regards one of the fractions meat or bone, while the second outlet product is aftertreated in the auxiliary cyclone to form a phase which is also optimal, but as regards the other fraction. The product from the second outlet of the auxiliary cyclone may either be mixed with the corresponding optimal product, further treated separately or returned to the process.

By this embodiment an even higher degree of separation may be provided than by use of only one hydrocyclone.

According to an embodiment of the invention, the meat-containing phase is preferably separated in a centrifuge into a meat protein containing slurry phase, which, if desired, is dried or thickened to form a meat protein product, and a water phase which is recycled for use when stirring the feedstock material.

The meat protein containing slurry phase prepared according to the invention may after drying or thickening be used for manufacturing moist fodder for pets and like fodder which can be frozen or otherwise preserved. The slurry phase can also be dried to a long-life protein powder. The powder is usable within the same fields as conventional meat-and-bone meal, however at considerably lower storage and transportation costs. After thickening, the slurry phase may also be used for fish and mink fodder because of its low content of fillers and its meat-like amino acid composition.

If veterinarily approved waste has been used as feedstock material the slurry phase can be dried or thickened to form a meat protein product usable as supplement in the manufacture of food, e.g. force meat.

The bone-containing phase leaving the cyclone through its bottom nozzle is usable in the manufacture of products used within the food and drug industry, e.g. as mineral sources, if the waste has been veterinarily approved.

In case of non-approved waste the bone may e.g. be used in the manufacture of mineral products for use in fertilizers or fodder supplements.

The bone-containing phase may be treated in various ways: According to one embodiment it may be treated with enzymes, until the majority of the meat proteins in the phase has been loosened from the bone parts, and the resulting reaction mixture can be separated into a meat protein containing slurry phase and a bone phase, preferably by means of a hydrocyclone. The meat protein containing slurry phase may be thickened in a centrifuge and, if desired, dried or mixed with the meat protein product.

According to another embodiment the bone-containing phase leaving the cyclone through its bottom nozzle, or the bone phase obtained by the above enzymatic treatment, may be acid treated until the majority of the contained calcium phosphate has been dissolved, whereafter the undissolved ossein-containing pieces can be separated off and, if desired, processed into a protein product.

According to a third embodiment the bone-containing phase leaving the cyclone through its bottom nozzle or the bone phase obtained by the above enzymatic treatment, may be hot water or steam treated until bone proteins contained therein are essentially removed and/or dissolved, whereafter the proteins can be isolated. In a special embodiment of the invention, the bone-containing phase leaving the cyclone through its bottom nozzle is hot water or steam treated until bone proteins contained therein are essentially suspended and/or dissolved. The water phase with the suspended and dissolved proteins is subsequently isolated from the formed mineral product and, if desired, dried into a collagen product.

According to these embodiments the further processing of the collected bone pieces can thus be an enzymatic treatment.

The enzyme "Alkalase" from Novo may be used by way of example. When the enzyme has reacted sufficiently long, the reaction mixture can be separated into a slurry phase and a bone phase, e.g. by means of an additional hydrocyclone. The meat phase can be separated into a glue-water phase and a meat slurry phase which can be dried or thickened to form a meat protein product, either separately or together with meat protein obtained from the phase leaving the vortex detector of the main hydrocyclone. The bone phase may be dried and ground into a powder which e.g. is usable as calcium and phosphorus fodder supplement.

The bone phase may also be acid treated to bring calcim phosphate contained therein into solution. The remaining ossein-product may be further processed into industrial gelatine if the feedstock material is slaughterhouse waste, or for edible gelatine if the feedstock material is approved bone waste or the like.

The bone phase may also be hot water or steam treated in order to dissolve the bone proteins. The solution can be dried to form a protein powder, while the undissolved bone parts can be ground to mineral meal rich in calcium and phosphorus.

The bone phase obtained from the bottom nozzle can also be directly acid treated without the meat lumps having been removed from the bone pieces. The reaction mixture may subsequently be separated into a liquid phase and a slurry phase, e.g. by means of a decanter. By adding base to the liquid phase fine calcium phosphate can be separated which may be filtered off and dried to form mineral meal. The slurry phase may be dried and ground to a supplement rich in protein.

The bone phase obtained from the bottom nozzle may also be directly hot water or steam treated. Undissolved bone parts can be separated from the prepared slurry and used as mineral supplement, while the slurry can be used as protein supplement, preferably after drying or thickening.

BRIEF DESCRIPTION OF THE DRAWINGS

The invention is further illustrated in the examples, reference being made to the drawing showing two embodiments of a process for treating a bone-containing animal material. One hydrocyclone is used in FIG. 1, while two series-connected hydrocyclones are used in FIG. 2.

DESCRIPTION OF THE PREFERRED EMBODIMENTS

EXAMPLE 1

Figure 1:
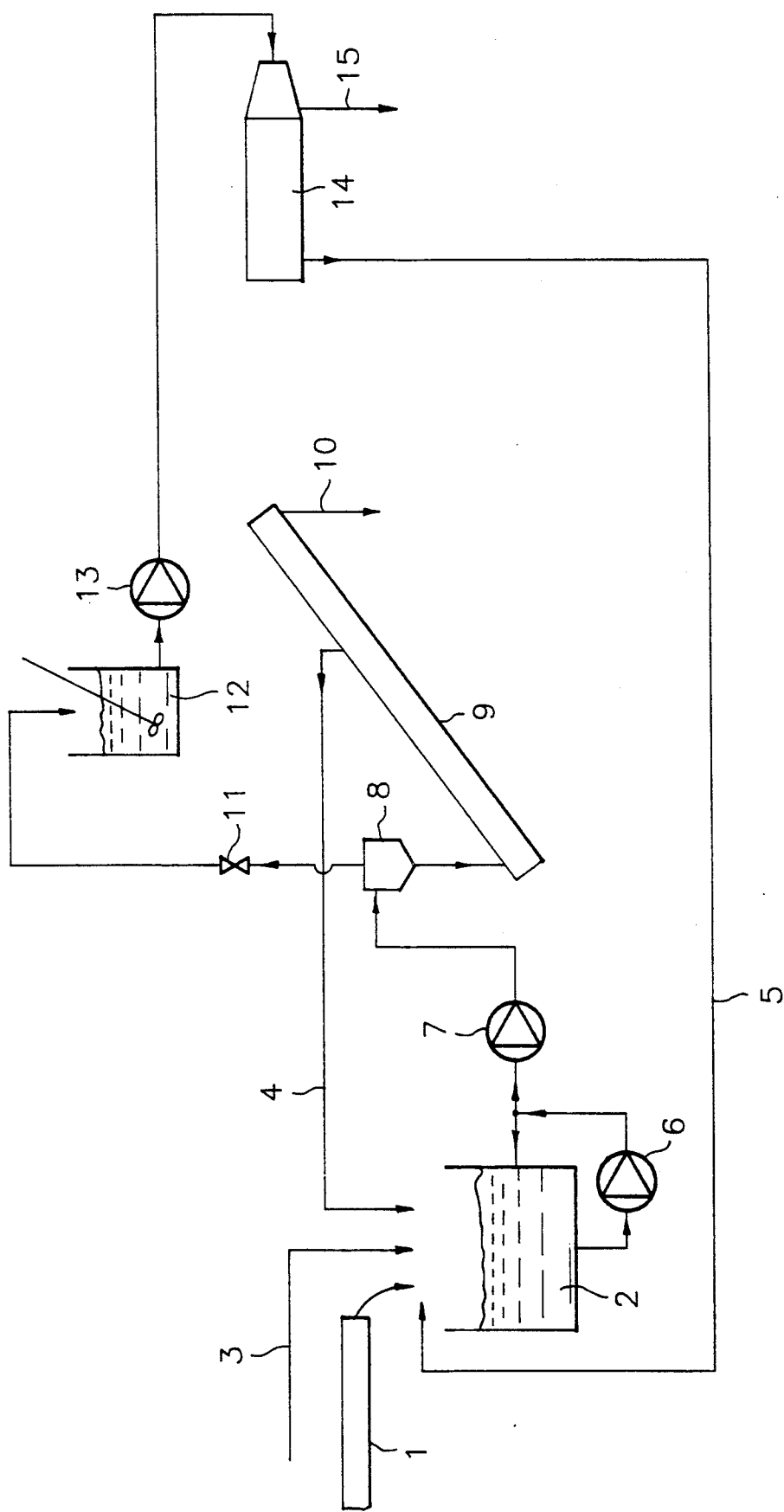

The feedstock material is a press cake, obtained by the process described in Danish patent specification No. 147,568 as follows:

Bone-containing slaughterhouse waste from hog and cattle slaughterhouses is chopped in a chopping machine provided with a cavity disc having a cavity diameter of 20 mm. The chopped material is heated to about 65° C. by adding steam and is continuously passed to a screw press. The press is provided with a sieve wall through which glue-water and liquid fat during the operation of the press are pressed out into a collecting bin. Solid materials, such as bone pieces, cartilage, meat parts, senews and the like, are by the press screw conveyed towards and out through the outlet slot of the press. The press cake has the following composition calculated on the dry matter content:

| protein: | about 50 weight-% |
| ash: | about 40 weight-% |
| fat: | about 5 weight-% |

This feedstock material is by a screw conveyor 1 passed to a mixing bin 2 at a velocity of about 300 kg/hr. Two pipes 4 and 5 supply the bin with glue-water which is separated off and recycled to the bin. A circulating pump 6 ensures that the feedstock material and the glue-water are intimately mixed in a bin 2 so as to form a homogeneous suspension.

Part of the glue-water being pressed out by the pressing process and subsequently liberated from fat is passed to the bin 2 through a pipe 3. This glue-water is so dosed that the suspension in the bin 2 has a constant solid content of about 5 weight-%.

A branch on the outlet of the circulating pump passes the suspension to the inlet of a revolution-adjustable pump 7. The outlet side of the pump is connected with the inlet of a hydrocyclone 8 having a cone angle of about 90°.

In the hydrocyclone the suspension is separated into two phases, designated the bone phase and the meat phase.

The bone phase leaves the hydrocyclone through the bottom nozzle. It mainly consists of glue-water and bone pieces. The bone phase is carried away by means of a screw conveyor 9 in which some glue-water is separated off and returned to the mixing bin 2 via the pipe 4.

The arrow 10 indicates the flow of the bone product collected at the end of the conveyor for further processing with the aim of obtaining protein and/or mineral products, such as bone meal, gelatine and/or calcium phosphate. Calculated as dry matter the content of the bone product is as follows:

| protein: | about 40 weight-% |
| ash: | about 50 weight-% |
| fat: | about 5 weight-% |

The meat phase leaves the hydrocyclone through the vortex detector. It is passed through a throttle valve 11 to a buffer tank 12 with mixer which serves to retain the meat fragments in a flowing state. By means of a revolution-adjustable pump 13 the suspension is continuously pumped from the tank 12 into a decanter 14.

Glue-water separated off in the decanter is returned via the pipe 5 to the mixing bin 2.

The arrow 15 indicates the flow of the slurry phase leaving the decanter. The slurry phase contains about 35% dry matter comprising the following components:

| protein: | about 70 weight-% |
| --- | --- |
| ash: | about 20 weight-% (including about 5 weight-% NaCl) |
| fat: | about 5 weight-% |

The slurry phase is further processed into meat protein products, such as moist fodder for pets, fish and mink fodder and/or dry meat protein powder.

EXAMPLE 2

In this example the feedstock material was a press cake from hog meat production waste. The press cake had the following average composition calculated on the dry matter content:

| protein: | 48.6 weight-% |
| --- | --- |
| ash: | 39.5 weight-% |
| fat: | 6.6 weight-% |

Figure 2:
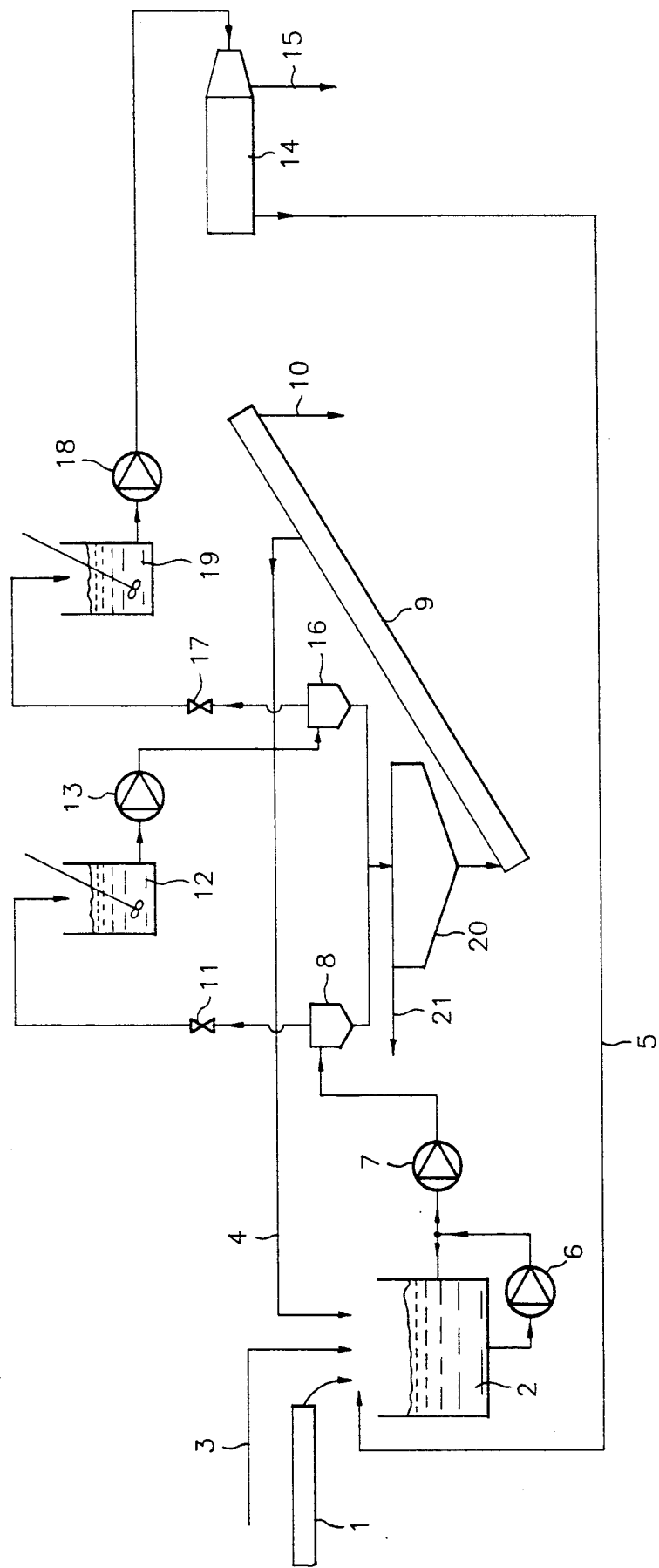

To optimize the composition of the meat phase experiments have been made using two series-connected hydrocyclones, as shown in FIG. 2. The plant components shown in FIG. 2 correspond essentially to the plant shown in FIG. 1, with the exception of an additional hydrocyclone 16 being inserted between the pump 13 and the decanter 14. The bottom nozzles of the two hydrocyclones open into a box 20 in which a certain separation of the bone phase is carried out into bone material conducted away by the screw conveyor 9 and some meat phase discharged as indicated by the arrow 21 and conducted away by the glue-water. The overflow from the conveyor 9 also contains some meat phase which may possibly be passed to the bin 12 instead of (as in FIG. 2) being returned to the bin 2. The valve 17, the buffer tank 19 with mixer and the pump 18 have the same functions as in case of the first hydrocyclone.

By dividing the comminuted and suspended press cake into a bone phase and a meat phase by the process according to the present invention there were obtained, as an average of a series of experiments, a bone phase having the following composition:

| protein: | 33 weight-% |
| --- | --- |
| ash: | 63 weight-% |
| fat: | 2 weight-% | and a meat phase having the following composition:

| protein: | 71 weight-% |
| --- | --- |
| ash: | 19 weight-% |
| fat: | 5 weight-% | both calculated on the dry matter content.

In comparison, the following results were obtained with press cakes from dead beasts and mixed raw materials.

| | | Press cake weight-% | Bone phase weight-% | Meat Phase weight-% |
| --- | --- | --- | --- | --- |
| Dead beasts | Protein | 61 | 38 | 76 |
| | Fat | 7 | 2 | 6 |
| | Ash | 26 | 55 | 6 |
| Mixed raw material | Protein | 51 | 37 | 70 |
| | Fat | 12 | 3 | 11 |
| | Ash | 32 | 57 | 10 |

All figures are based on dry matter content.

In a series of experiments samples have been taken from the top phase of cyclones I and II, and analyses have shown that the ash content in the meat phase hereby decreases:

| | Cyclone I weight-% | Cyclone II weight-% |
| --- | --- | --- |
| Ash in fatless dry matter | 12.3 | 8.6 |

The experiments have shown that the bone phase on an average leaves the system with as much as 35% protein and about 60% ash. It is unlikely that is possible to further reduce the protein content mechanically. Consequently, if it is desired to obtain a bone meal having a lower protein content, the bone material must be subjected to hydrolysis, either at high temperature or by means of enzymes.

EXAMPLE 3

The bone material was pressure boiled, about 1 kg bone material and 0.75 l water being pressure boiled at different combinations of pressure and temperature. After cooling to 100° C. and centrifuging the bone and liquid phases were analysed with the following results:

| | Untreated | 126° C. | 130° C. | 136° C. | 150° C. |
| --- | --- | --- | --- | --- | --- |
| Bone phase, weight-% in dry matter | | | | | |
| Ash | 63.4 | 76.7 | 78.3 | 81.0 | 82.5 |
| Protein | 33.0 | 18.8 | 16.0 | 12.8 | 12.0 |
| % of total protein | | | | | |
| in bottoms product | | 44 | 37 | 26 | 28 |
| in liquid phase | | 50 | 59 | 64 | 68 |

After boiling at 136° and 150° C. all bone parts had vanished (powder). The liquid phase formed a gel after boiling at 126°, 130° and 136° C. and standing at room temperature, but not after boiling at 150° C.

If a low protein content in the bone meal is desired, it is thus possible to undertake suitable pressure boiling of the bone phase from the hydrocyclone. Hereby it is possible to reduce the protein content to about 15% and obtain an ash content exceeding 80%. At the same time a protein phase with gel-forming properties is obtained.

We claim:

1. A process for producing protein products from a bone-containing animal material, comprising the steps of:

comminuting a bone-containing animal material;

stirring the comminuted material with water to form a suspension;

conveying the suspension to a hydrocyclone using a pump, said hydrocyclone having a bottom nozzle and a vortex detector;

separating the suspension into a bone-containing phase and a meat protein containing phase in the hydrocyclone, said bone-containing phase leaving the hydrocyclone through the bottom nozzle and the meat protein containing phase leaving the hydrocyclone through the vortex detector;

hot water or steam treating the bone-containing phase until bone proteins contained in said bone-containing phase are essentially suspended and/or dissolved, and then isolating a water phase containing the suspended and/or dissolved bone proteins from a mineral product comprising undissolved bone parts from the bone-containing phase; and then processing the meat protein containing phase into a protein product.

2. A process according to claim 1, wherein the isolated water phase is dried to obtain a collagen product.

3. A process for producing a protein product from a bone-containing animal material, comprising the steps of:

comminuting a bone-containing animal material;

stirring the comminuted material with water to form a suspension;

conveying the suspension to a hydrocyclone by means of a pump, said hydrocyclone having a bottom nozzle and a vortex detector;

separating the suspension into a bone-containing phase and a meat protein containing phase in the hydrocyclone, the bone-containing phase leaving the hydrocyclone through the bottom nozzle and the meat protein containing phase leaving the hydrocyclone through the vortex detector;

separating the bone-containing phase into bone material and a meat phase in a separation box, said separation box being in contact with the bottom nozzle of the hydrocyclone; and then processing the meat protein containing phase into a protein product.

4. Process according to claim 3, wherein the bone-containing animal material is comminuted into pieces having diameters which essentially do not exceed 20 mm.

5. Process according to claim 3, wherein the bone-containing animal material is slaughterhouse waste which has been heated to a temperature within the range 50°–90° C. and pressed in a screw press in order to remove fat and water.

6. Process according to claim 3, wherein the suspension contains from 5 to 25% by weight dry matter.

7. Process according to claim 3, wherein the stirring is carried out in a mixing bin by means of a circulating pump.

8. Process according to claim 3, wherein the suspension is passed to an inlet of the hydrocyclone by means of an adjustable pump supplied with suspension from an outlet of the circulating pump.

9. Process according to claim 3, wherein the bone-containing material is further comminuted prior to its introduction into the hydrocyclone.

10. Process according to claim 3, wherein the hydrocyclone has a cone angle exceeding 25° C.

11. Process according to claim 3, wherein one of said bone-containing phase and said meat protein containing phase is further separated in an additional hydrocyclone, said additional hydrocyclone being provided in series with the bottom nozzle or the vortex detector of said hydrocyclone.

12. Process according to claim 3, wherein the processing of the meat protein containing phase comprises separating the meat protein containing phase into a slurry phase, which slurry phase is thickened or dried into a meat protein product, and a water phase which is recycled for use during stirring of the comminuted material.

* * * * *